(12) United States Patent
Campton et al.

(10) Patent No.: US 12,224,627 B2
(45) Date of Patent: Feb. 11, 2025

(54) ROTOR ASSEMBLY FOR AN ELECTRIC MOTOR

(71) Applicant: BorgWarner Inc., Auburn Hills, MI (US)

(72) Inventors: Calahan B. Campton, Royal Oak, MI (US); Eric Bourniche, Preutin-Higny (FR); James Bourn, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 260 days.

(21) Appl. No.: 17/867,989

(22) Filed: Jul. 19, 2022

(65) Prior Publication Data

US 2024/0030765 A1 Jan. 25, 2024

(51) Int. Cl.
*H02K 1/32* (2006.01)
*H02K 7/116* (2006.01)
*H02K 9/193* (2006.01)

(52) U.S. Cl.
CPC ............... *H02K 1/32* (2013.01); *H02K 7/116* (2013.01); *H02K 9/193* (2013.01)

(58) Field of Classification Search
CPC ........... H02K 1/32; H02K 7/116; H02K 9/193
USPC ........................................................... 310/54
See application file for complete search history.

(56) References Cited

U.S. PATENT DOCUMENTS

2013/0038151 A1* 2/2013 Ohashi .................. H02K 7/086
310/59

FOREIGN PATENT DOCUMENTS

JP 2015534803 * 12/2015 ............... H02K 1/32

OTHER PUBLICATIONS (Machine translation of JP2015534803, https://patents.google.com/patent/JP2015534803A/en?oq=jp2015534803).*
Cleantechnica, "More Details on Tesla's Innovative Carbon-Wrapped Motor", https://cleantechnica.com/2021/06/16/more-details-on-teslas-innovative-carbon-wrapped-motor/, Jun. 16, 2021, 9 pages.
Sumitomo Bakelite Co., Ltd., "Automotive/Railways/Aircraft Webpage", https://www.sumibe.co.jp/english/product/use/automotive/index.html, 2015, 2 pages.

* cited by examiner

*Primary Examiner* — Terrance L Kenerly
(74) *Attorney, Agent, or Firm* — Howard & Howard Attorneys PLLC (57) ABSTRACT

A rotor assembly includes a shaft defining a lubricant inlet channel for receiving a lubricant and a lamination stack. The lamination stack is rotatably coupled to the shaft, extends between first and second lamination stack ends, and defines a lubricant cooling channel in fluid communication with the lubricant inlet channel. The rotor assembly also includes a first end cap adjacent to the first lamination stack end and a second end cap adjacent to the second lamination stack end. One of the first end cap and the second end cap defines an end cap inlet at a first radial distance from the shaft, a lubricant outlet channel defined to extend at least partially radially inward toward the shaft, and an end cap outlet at a second radial distance from the shaft which is less than the first radial distance for expelling the lubricant.

20 Claims, 7 Drawing Sheets

ROTOR ASSEMBLY FOR AN ELECTRIC MOTOR

BACKGROUND OF THE INVENTION

1. Field of the Invention

The invention generally relates to a rotor assembly for an electric motor and to an electric motor including the rotor assembly.

2. Description of the Related Art

Electric motors include a rotor assembly and a stator disposed about the rotor assembly. Rotor assemblies commonly include a shaft, a stator lamination stack disposed about the shaft, a first end cap adjacent to one end of the stator lamination stack, and a second end cap adjacent to the opposite end of the stator lamination stack. Typically, permanent magnets are embedded into the stator lamination stack and coil windings are disposed in the stator. In these electric motors, energization of the coil windings in the stator generates magnetic flux which interacts with the permanent magnets in the stator lamination stack to impart a force which causes the rotor assembly to rotate.

Interaction between magnetic flux generated by the energized coil windings and the permanent magnets in the stator lamination stack generates heat. Rotation of the rotor assembly also generates heat by friction. Therefore, the stator lamination stack, the first end cap, and the second end cap of the rotor assembly typically defines lubricant channels to provide lubricant throughout the rotor assembly. The lubricant flowing through the lubricant channels cools the rotor assembly. The lubricant flowing through the lubricant channels of the rotor assembly is forced radially away from the shaft by centrifugal forces imparted on the lubricant by rotation of the rotor assembly. The lubricant, therefore, is typically not introduced to the lubricant channels under pressure because rotation of the rotor assembly generates enough centrifugal force to flow the lubricant through the lubricant channels. As such, an inlet for the lubricant channels is typically defined near, or within, the shaft and the output for the lubricant channels is typically defined radially away from the shaft so that lubricant is not trapped within the rotor assembly by the centrifugal forces.

However, during low rotational speeds (e.g. RPM) of the rotor assembly, the rotor assembly may fail to impart sufficient centrifugal force to the lubricant to cause the lubricant to flow through the lubricant channels, thus failing to provide adequate cooling to the rotor assembly and risking damage to the rotor assembly. Moreover, during high rotational speeds (e.g. RPM) of the rotor assembly, a flow rate of lubricant is insufficient given the high centrifugal forces imparted on the lubricant to prevent air from also being drawn into the lubricant channels, reducing the efficiency of cooling and risking damage to the rotor assembly.

As such, there remains a need to provide an improved rotor assembly for an electric motor.

SUMMARY OF THE INVENTION AND ADVANTAGES

A rotor assembly for an electric motor is disclosed. The rotor assembly includes a shaft extending along and rotatable about an axis. The shaft defines a lubricant inlet channel for receiving a lubricant. The rotor assembly also includes a lamination stack rotatably coupled to the shaft and extending along the axis between a first lamination stack end and a second lamination stack end. The lamination stack at least partially defines a lubricant cooling channel between the first lamination stack end and the second lamination stack end. The lubricant cooling channel is in fluid communication with the lubricant inlet channel.

The rotor assembly further includes a first end cap adjacent to the first lamination stack end and a second end cap adjacent to the second lamination stack end. One of the first end cap and the second end cap defines an end cap inlet for receiving the lubricant from the lubricant cooling channel, a lubricant outlet channel for receiving the lubricant from the end cap inlet, and an end cap outlet for receiving the lubricant from the lubricant outlet channel and for expelling the lubricant from the one of the first end cap and the second end cap. The end cap inlet is defined at a first radial distance from the shaft, the lubricant outlet channel is defined to extend at least partially radially inward toward the shaft, and the end cap outlet is defined at a second radial distance from the shaft. The second radial distance at which the end cap outlet is defined is less than the first radial distance at which the end cap inlet is defined.

The relative radial positioning of the end cap outlet and the end cap inlet reduces the amount of work required to flow pressurized lubricant through the lubricant cooling channel. Additionally, during low rotational speeds (e.g. RPM) of the rotor assembly, a flow rate of lubricant through the lubricant cooling channel is ensured to adequately provide cooling of the rotor assembly and prevent damage to the rotor assembly. Moreover, during high rotational speeds (e.g. RPM) of the rotor assembly, the flow rate of lubricant through the lubricant cooling channel is ensured to prevent air from being drawn into the lubricant cooling channel, thus increasing the efficiency of cooling and preventing damage to the rotor assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

With reference to the Figures, wherein like numerals indicate like parts throughout the several views, a rotor assembly 20 for an electric motor 22 is shown schematically in FIGS. 1-10. The rotor assembly 20 includes a shaft 24 extending along and rotatable about an axis A1. The shaft 24 defines a lubricant inlet channel 26 for receiving a lubricant. The rotor assembly 20 also includes a lamination stack 28 rotatably coupled to the shaft 24 and extending along the axis A1 between a first lamination stack end 30 and a second lamination stack end 32. The lamination stack 28 at least partially defines a lubricant cooling channel 34 between the first lamination stack end 30 and the second lamination stack end 32. The lubricant cooling channel 34 is in fluid communication with the lubricant inlet channel 26.

The rotor assembly 20 further includes a first end cap 36 adjacent to the first lamination stack end 30 and a second end cap 38 adjacent to the second lamination stack end 32. One of the first end cap 36 and the second end cap 38 defines an end cap inlet 40 for receiving the lubricant from the lubricant cooling channel 34, a lubricant outlet channel 42 for receiving the lubricant from the end cap inlet 40, and an end cap outlet 44 for receiving the lubricant from the lubricant outlet channel 42 and for expelling the lubricant from the one of the first end cap 36 and the second end cap 38. In other words, the lubricant outlet channel 42 is for expelling the lubricant from the same end cap 36, 38 that defines the end cap inlet 40 and the lubricant outlet channel 42, and either the first end cap 36 or the second end cap 38 may define the end cap inlet 40, the lubricant outlet channel 42, and the end cap outlet 44. The end cap inlet 40 is defined at a first radial distance RD1 from the shaft 24, the lubricant outlet channel 42 is defined to extend at least partially radially inward toward the shaft 24, and the end cap outlet 44 is defined at a second radial distance RD2 from the shaft 24. The second radial distance RD2 at which the end cap outlet 44 is defined is less than the first radial distance RD1 at which the end cap inlet 40 is defined.

The relative radial positioning of the end cap outlet 44 and the end cap inlet 40 reduces the amount of work required to flow pressurized lubricant through the lubricant cooling channel 34. Additionally, during low rotational speeds (e.g. RPM) of the rotor assembly 20, a flow rate of lubricant through the lubricant cooling channel 34 is ensured to adequately provide cooling of the rotor assembly 20 and prevent damage to the rotor assembly 20. Moreover, during high rotational speeds (e.g. RPM) of the rotor assembly 20, the flow rate of lubricant through the lubricant cooling channel 34 is ensured to prevent air from being drawn into the lubricant cooling channel 34, thus increasing the efficiency of cooling and preventing damage to the rotor assembly 20.

The one of the first end cap 36 and the second end cap 38 extends a third radial distance RD3 from the shaft 24. In other words, the same end cap 36, 38 that defines the end cap inlet 40, the lubricant outlet channel 42, and the end cap outlet 44 extends a third radial distance RD3 from the shaft 24. Although not required, the second radial distance RD2 of the end cap outlet 44 may be less than half of the third radial distance RD3. In non-limiting examples, the second radial distance RD2 of the end cap outlet 44 may be less than 40% of the third radial distance RD3, the second radial distance RD2 of the end cap outlet 44 may be less than 30% of the third radial distance RD3, the second radial distance RD2 of the end cap outlet 44 may be less than 20% of the third radial distance RD3, and the second radial distance RD2 of the end cap outlet 44 may be less than 10% of the third radial distance RD3. It is also to be appreciated that the end cap outlet 44 may be defined approximately at the shaft 24, as shown in FIGS. 1-8 and 10. In the embodiments where the end cap outlet 44 is defined approximately at the shaft 24, the second radial distance RD2 of the end cap outlet 44 is approximately zero (i.e., less than even 10% of the third radial distance RD3).

In the embodiments where the end cap outlet 44 is defined approximately at the shaft 24, the amount of work required to flow pressurized lubricant through the lubricant cooling channel 34 is minimized. More specifically, the amount of work required to flow pressurized lubricant through the lubricant cooling channel 34 is smallest in embodiments where the end cap outlet 44 is radially closest to where the lubricant enters the rotor assembly 20, more specifically an inlet to the lubricant inlet channel 26. As such, it is to be appreciated that defining the end cap outlet 44 radially closest to the shaft 24 improves the efficiency of the rotor assembly 20.

It is also to be appreciated that the second radial distance RD2 of the end cap outlet 44 may even be greater than half of the third radial distance RD3. In non-limiting examples, the second radial distance RD2 of the end cap outlet 44 may be less than 90% of the third radial distance RD3, the second radial distance RD2 of the end cap outlet 44 may be less than 80% of the third radial distance RD3, the second radial distance RD2 of the end cap outlet 44 may be less than 70% of the third radial distance RD3, or the second radial distance RD2 of the end cap outlet 44 may be less than 60% of the third radial distance RD.

Although not required, the first radial distance RD1 of the end cap inlet 40 may be greater than half of the third radial distance RD3. In non-limiting examples, the first radial distance RD1 of the end cap inlet 40 may be greater than 60% of the third radial distance RD3, the first radial distance RD1 of the end cap inlet 40 may be greater than 70% of the third radial distance RD3, the first radial distance RD1 of the end cap inlet 40 may be greater than 80% of the third radial distance RD3, and the first radial distance RD1 of the end cap inlet 40 may be greater than 90% of the third radial distance RD3.

It is also to be appreciated that the first radial distance RD1 of the end cap inlet 40 may even be less than half of the third radial distance RD3. In non-limiting examples, the first radial distance RD1 of the end cap inlet 40 may be greater than 40% of the third radial distance RD3, the first radial distance RD1 of the end cap inlet 40 may be greater than 30% of the third radial distance RD3, the first radial distance RD1 of the end cap inlet 40 may be greater than 20% of the third radial distance RD3, and the first radial distance RD1 of the end cap inlet 40 may be greater than 10% of the third radial distance RD3.

Figure 7:
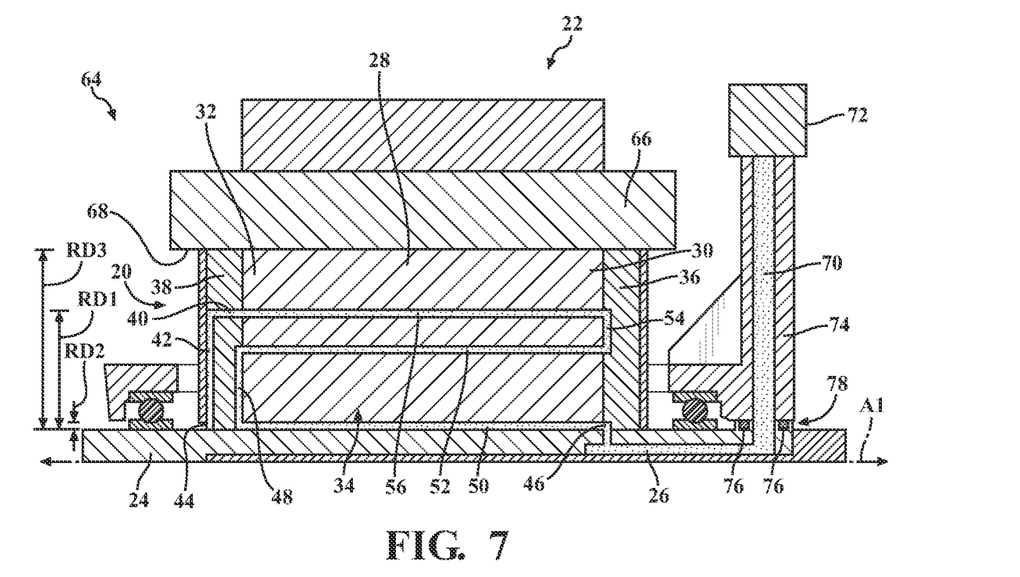
FIG. 7 is a cross-sectional view, with partial schematic illustration, of another embodiment of the rotor assembly in the electric motor system, with the lubricant cooling channel at least partially delimited by the shaft by being at least partially defined as a groove by the lamination stack.
Figure 8:
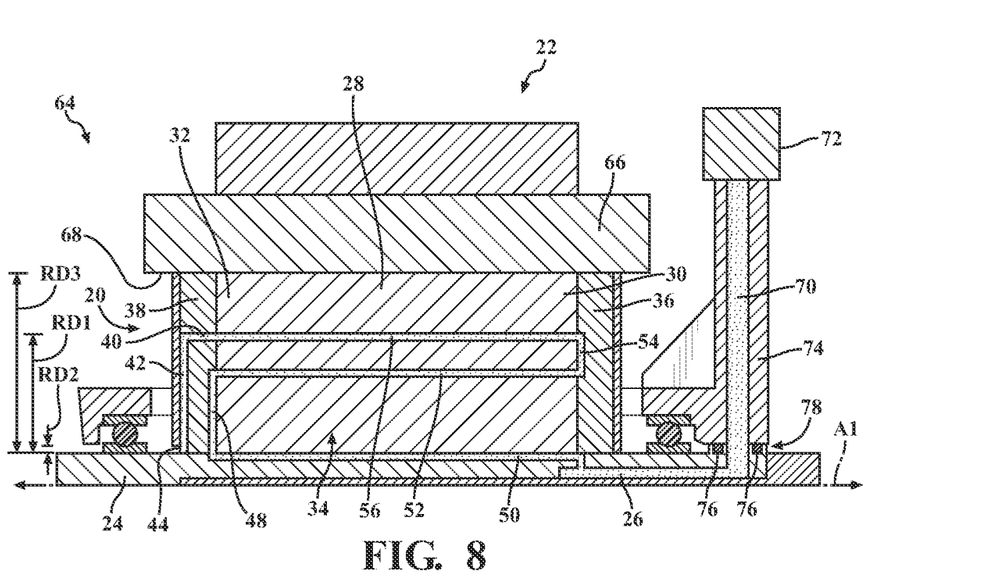
FIG. 8 is a cross-sectional view, with partial schematic illustration, of another embodiment of the rotor assembly in the electric motor system, with the lubricant cooling channel at least partially delimited by the shaft by being at least partially defined as a groove by the shaft.

The lubricant cooling channel 34 may be at least partially delimited by the shaft 24, as shown in FIGS. 7 and 8. The lubricant cooling channel 34 may be at least partially delimited by the shaft 24 by being at least partially defined as a groove by the lamination stack 28, as shown in FIG. 7. Additionally, the lubricant cooling channel 34 may be at least partially delimited by the shaft 24 by being at least partially defined as a groove by the shaft 24, as shown in FIG. 8. It is also to be appreciated that the lubricant cooling channel 34 may be at least partially delimited by the shaft 24 by both being at least partially defined as a groove by the lamination stack 28 and being at least partially defined as a groove by the shaft 24, which may include orienting the shaft 24 and the lamination stack 28 to overlap the groove defined by the lamination stack 28 and the groove defined by the shaft 24 to collectively form the lubricant cooling channel 34.

The first end cap 36 may define a first end channel 46 for receiving the lubricant from the lubricant inlet channel 26 and for directing the lubricant to the lubricant cooling channel 34. It is to be appreciated that the first end channel 46 may be present even where the lubricant cooling channel 34 is delimited at least partially by the shaft 24. The first end channel 46 may also be defined to extend radially outward relative to the axis A1 (e.g. away from the shaft 24) to direct lubricant from the lubricant inlet channel 26 defined by the shaft 24 radially away from the shaft 24, which then is directed axially along the shaft 24 by the lubricant cooling channel 34.

Figure 4:
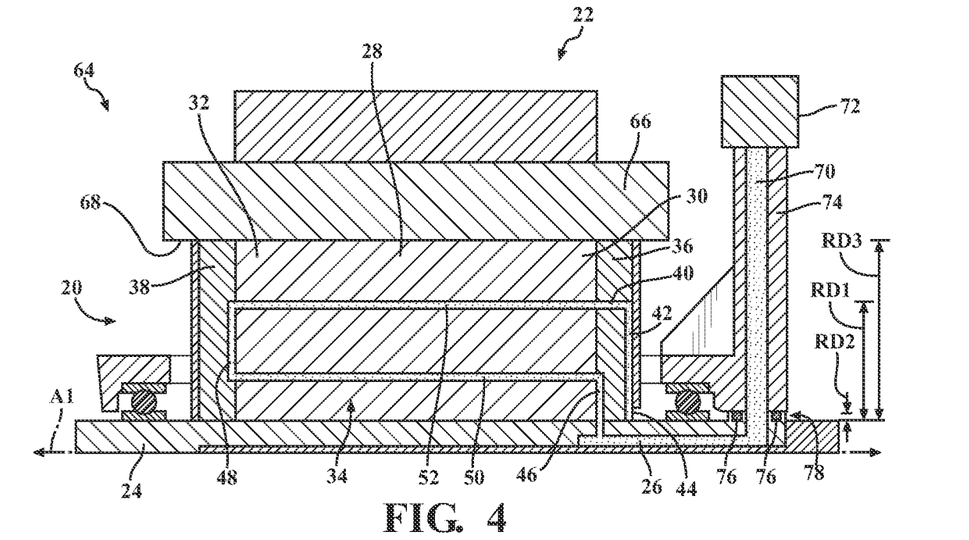
FIG. 4 is a cross-sectional view, with partial schematic illustration, of another embodiment of the rotor assembly in the electric motor system, with the rotor assembly including a shaft, a lamination stack defining a first cooling pass and a second cooling pass, a first end cap, and a second end cap, with the first end cap defining an end cap inlet, a lubricant outlet channel, and an end cap outlet.
Figure 6:
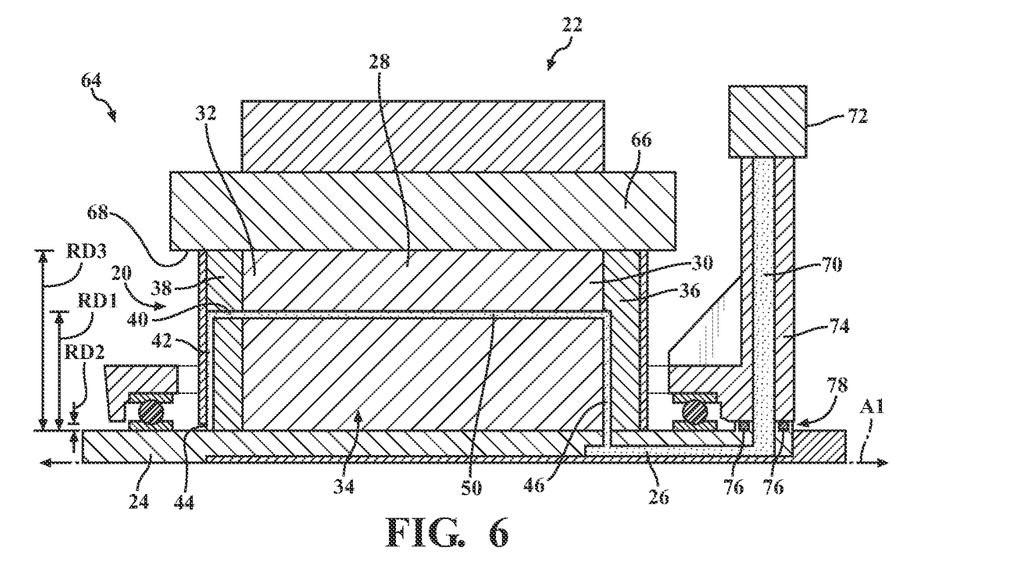
FIG. 6 is a cross-sectional view, with partial schematic illustration, of another embodiment of the rotor assembly in the electric motor system, with the second end cap defining the end cap inlet, the lubricant outlet channel, and the end cap outlet.

The second end cap 38 may define a second end channel 48 for receiving the lubricant from the lubricant cooling channel 34. The second end channel 48 may be defined to extend radially outward relative to the axis A1 (e.g. away from the shaft 24). The lubricant cooling channel 34 may also be defined to include a first cooling pass 50 extending between the first end channel 46 and the second end channel 48. It is to be appreciated that only a first cooling pass 50 may be present, as shown in FIG. 6. However, the lubricant cooling channel 34 may also be defined to include a second cooling pass 52 extending from the second end channel 48 toward the first end cap 36, as shown in FIG. 4.

Figure 5:
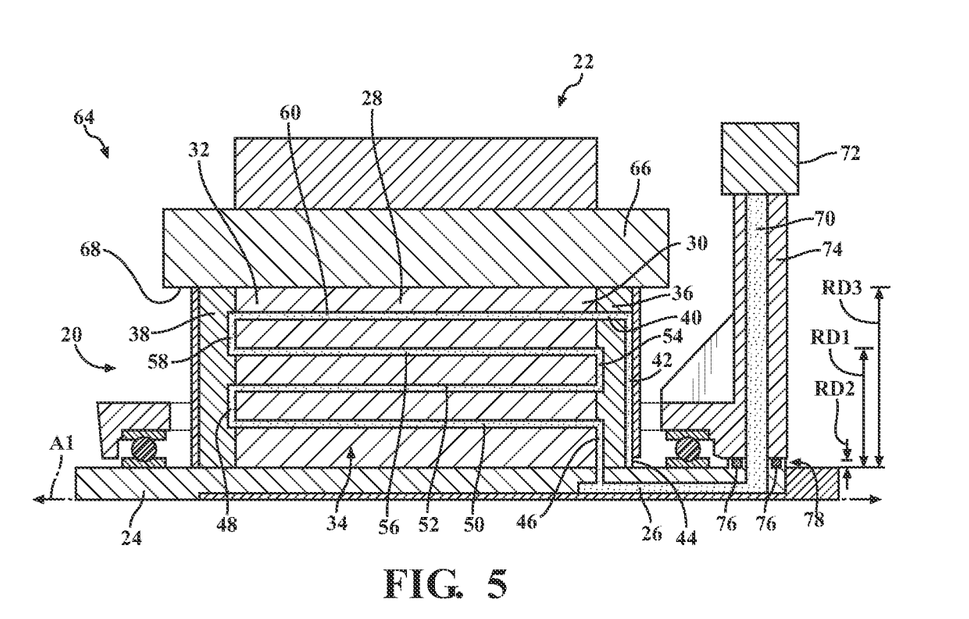
FIG. 5 is a cross-sectional view, with partial schematic illustration, of another embodiment of the rotor assembly in the electric motor system, with the lamination stack further defining a third cooling pass and a fourth cooling pass.

The first end cap 36 may further define a third end channel 54 for receiving the lubricant from the second cooling pass 52. The lubricant cooling channel 34 may also be further defined to include a third cooling pass 56 extending from the third end channel 54 toward the second end cap 38, as shown in FIGS. 1-3, and 7-10. The third end channel 54 may be defined to extend radially outward relative to the axis A1 (e.g. away from the shaft 24). The second end cap 38 may further define a fourth end channel 58 for receiving the lubricant from the third cooling pass 56. The lubricant cooling channel 34 may also be further defined to include a fourth cooling pass 60 extending from the fourth end channel 58 toward the first end cap 36, as shown in FIG. 5.

The first cooling pass 50 may be spaced radially away from the shaft 24, the second cooling pass 52 may be spaced radially away from the shaft 24 such that the first cooling pass 50 is spaced radially between the second cooling pass 52 and the shaft 24, the third cooling pass 56 may be spaced radially away from the shaft 24 such that the second cooling pass 52 is spaced radially between the third cooling pass 56 and the first cooling pass 50, and the fourth cooling pass 60 may be spaced radially away from the shaft 24 such that the third cooling pass 56 is spaced radially between the fourth cooling pass 60 and the second cooling pass 52. In other words, the first cooling pass 50, the second cooling pass 52, the third cooling pass 56, and/or the fourth cooling pass 60 may each be sequentially spaced further away from the shaft 24, thus permitting fluid to flow without working against centrifugal forces imparted to the lubricant by rotation of the rotor assembly 20. It is to be appreciated that the first end cap 36, the second end cap 38, and the lamination stack 28 may define more than four end channels and more than four cooling passes. Each subsequent end channel and cooling pass may be spaced radially away from the previous end channel and cooling pass.

The lamination stack 28 may be manufactured from a plurality of laminations which are fixed to one another, in non-limiting examples by interlocking, welding, clamping, and/or bonding. To improve manufacturability of the lamination stack 28, each lamination of the lamination stack 28 may be the same as every other lamination in the lamination stack 28. As such, the first cooling pass 50, the second cooling pass 52, the third cooling pass 56, the fourth cooling pass 60, and any other cooling pass may each be defined in the same location on each lamination in the lamination stack 28. Therefore, the first end channel 46 permits the lubricant to cool a center of the lamination stack 28 instead of being limited to cooling an outer surface of the lamination stack 28. The second end channel 48, the third end channel 54, the fourth end channel 58, and any other subsequent end channels permits the lubricant to flow through the first cooling pass 50, the second cooling pass 52, the third cooling pass 56, and the fourth cooling pass 60 by flowing the lubricant radially away from the shaft 24. In other words, the second end channel 48, the third end channel 54, the fourth end channel 58, and any other subsequent end channels enable the lubricant to "turn" and change the direction of flow along the axis A1 while still maintaining the advantages in manufacturability of having each lamination in the lamination stack 28 being the same. Additionally, or alternatively, each lamination in the lamination stack 28 may be manufactured without any of the cooling passes, fixed together, and the cooling passes may be formed thereafter, in a non-limited example by boring or drilling, and the end channels still maintain the advantages as described above.

As discussed above, either the first end cap 36 may define the end cap inlet 40, the lubricant outlet channel 42, and the end cap outlet 44. However, in some embodiments, the first end cap 36 defines the end cap inlet 40, the lubricant outlet channel 42, and the end cap outlet 44, as shown in FIGS. 4 and 5. In these embodiments, the end cap inlet 40 may receive the lubricant from the second cooling pass 52, as shown in FIG. 4, or may receive the lubricant from the fourth cooling pass 60, as shown in FIG. 5. In other embodiments, the second end cap 38 defines the end cap inlet 40, the lubricant outlet channel 42, and the end cap outlet 44, as shown in FIGS. 1-3 and 7-10. In these embodiments, the end cap inlet 40 may receive the lubricant from the first cooling pass 50, as shown in FIG. 6, or may receive the lubricant from the third cooling pass 56, as shown in FIGS. 1-3 and 7-10.

The lubricant cooling channel 34 may also be further defined as a first lubricant cooling channel 34. The lamination stack 28 may further define a second lubricant cooling channel, a third lubricant cooling channel, a fourth lubricant cooling channel, a fifth lubricant cooling channel, a sixth lubricant cooling channel, or more than six lubricant cooling channels. Each lubricant cooling channel may have any of the characteristics of the various embodiments of the first lubricant cooling channel 34 as described herein. Each lubricant cooling channel may be spaced circumferentially from one another about the axis A1. Each lubricant cooling channel may be fluidly coupled to one another through a manifold that extends circumferentially about the axis A1. The lubricant inlet channel 26 or the first end channel 46 may define the manifold, among other possibilities.

Moreover, although each lubricant cooling channel may be the same, each lubricant cooling channel need not be the same. More specifically, the lubricant cooling channels may alternate in that the lubricant may be expelled from the first end cap 36, then from the second end cap 38, then from the first end cap 36, etc., when viewed sequentially circumferentially about the axis A1. Alternating which end cap 36, 38 the lubricant is expelled from may assist in lubricating other components surrounding the rotor assembly 20.

Figure 1:
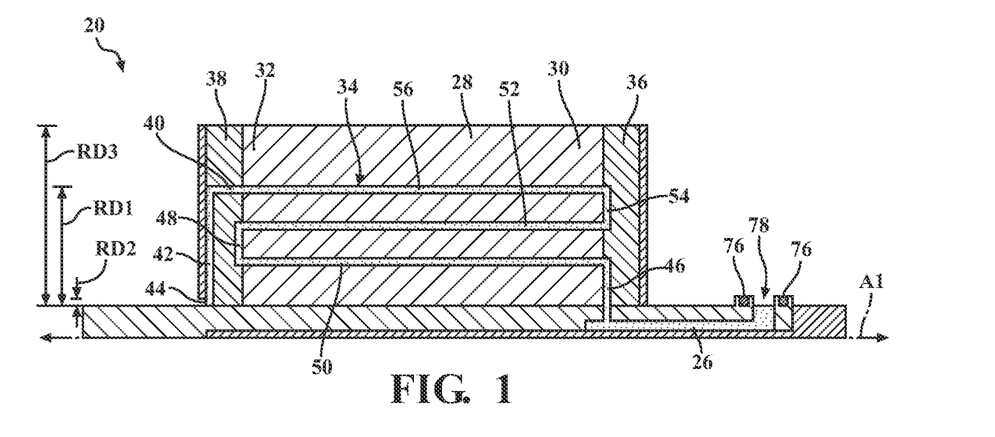
FIG. 1 is a cross-sectional view of a rotor assembly.
Figure 2:
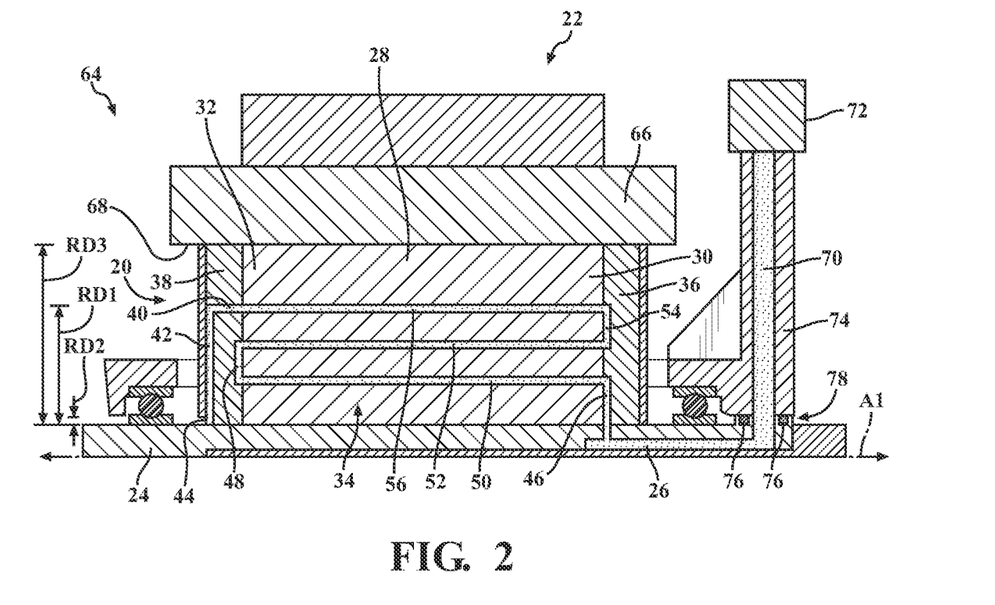
FIG. 2 is a cross-sectional view, with partial schematic illustration, of an electric motor system including an electric motor including a stator, the rotor assembly of FIG. 1, and a pressurized lubricant feed.

The rotor assembly 20 may be integrated into an electric motor system 64, as shown in FIG. 2. More specifically, the electric motor system 64 may include an electric motor 22. The electric motor 22 may include a stator 66 extending along the axis A1 and defining a stator interior 68. The rotor assembly 20 may be disposed in the stator interior 68 of the stator 66. The electric motor system 64 may also include a pressurized lubricant feed 70 configured to provide lubricant under pressure to the lubricant inlet channel 26 defined by the shaft 24. The electric motor system 64 may also further include a pump 72 configured to pressurize lubricant. The pump 72 is in fluid communication with the pressurized lubricant feed 70. Additionally, the pump 72 may be electrically actuated, mechanically actuated, hydraulically actuated, and/or pneumatically actuated.

The electric motor system 64 may further include a housing 74 disposed about the electric motor 22. It is to be appreciated that the housing 74 may be the housing for the electric motor 22 (e.g. fixed to, or integral with, the stator 66), or a housing separate from the housing of the electric motor 22. Although not required, the pressurized lubricant feed 70 may be defined at least partially by the housing 74. The electric motor system 64 may further include at least one seal 76 disposed between the housing 74 and the shaft 24 adjacent to the pressurized lubricant feed 70 to fluidly seal an inlet interface 78 between the housing 74 and the shaft 24. Each seal 76 may each comprise polytetrafluoroethylene (PTFE), polyetheretherketone (PEEK), or any suitable high-performance engineering thermoplastic having a low coefficient of friction.

The shaft 24 may be hollow or may be solid. The shaft 24 may also have a shaft end 80. The pressurized lubricant feed 70 may be spaced from the shaft end 80 of the shaft 24 along the axis A1, as shown in FIG. 10. In the embodiments where the housing 74 at least partially defines the pressurized lubricant feed 70, the housing 74 may be spaced from the shaft end 80 of the shaft 24 along the axis A1. In this embodiment, only a single seal 76 is required. Moreover, in the embodiments with multiple lubricant cooling channels, the housing 74 and/or the pressurized lubricant feed 70 may include the manifold. In other embodiments, as shown in FIGS. 1-9, two seals 76 are disposed between the pressurized lubricant feed 70 and the shaft 24.

Figure 9:
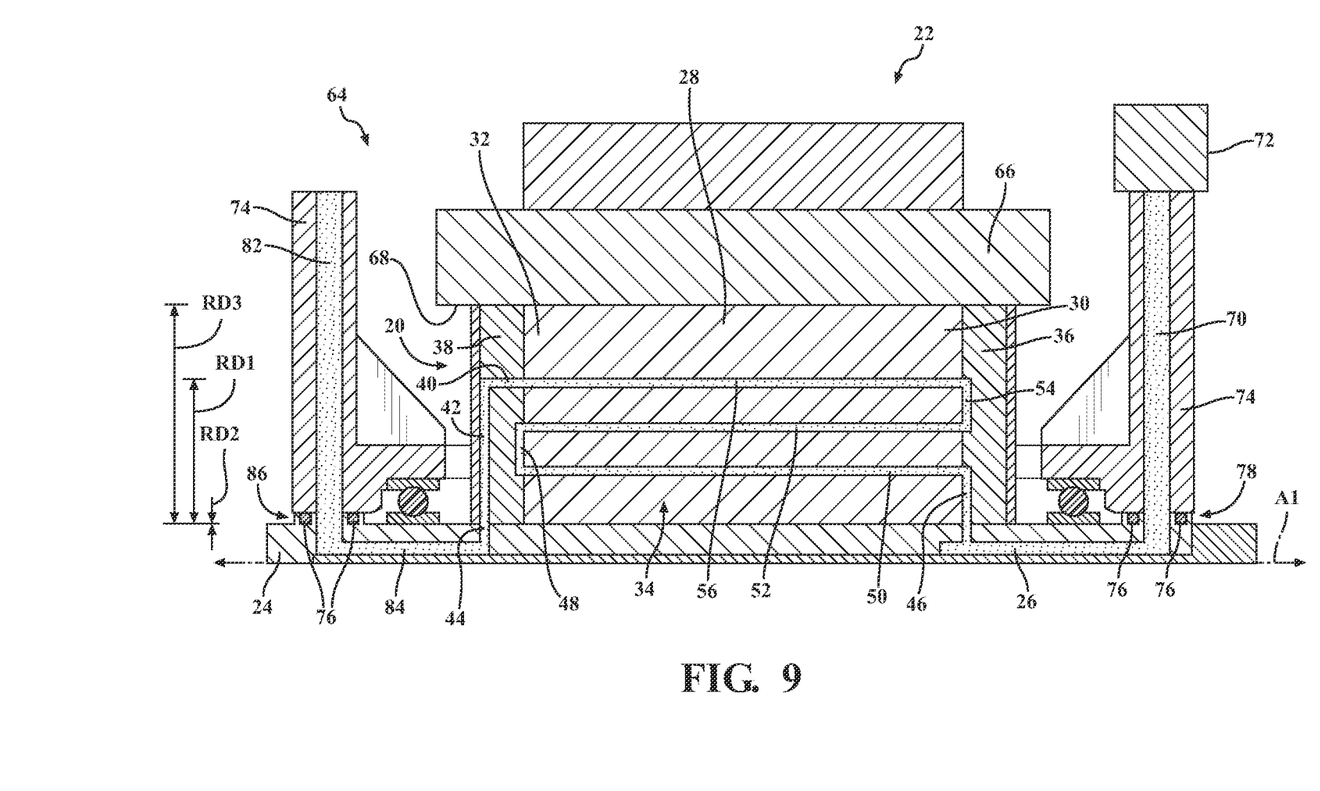
FIG. 9 is a cross-sectional view, with partial schematic illustration, of another embodiment of the rotor assembly in the electric motor system, with the electric motor system including a return line to receive the lubricant expelled from the end cap outlet to permit reuse of the pressurized lubricant.
Figure 10:
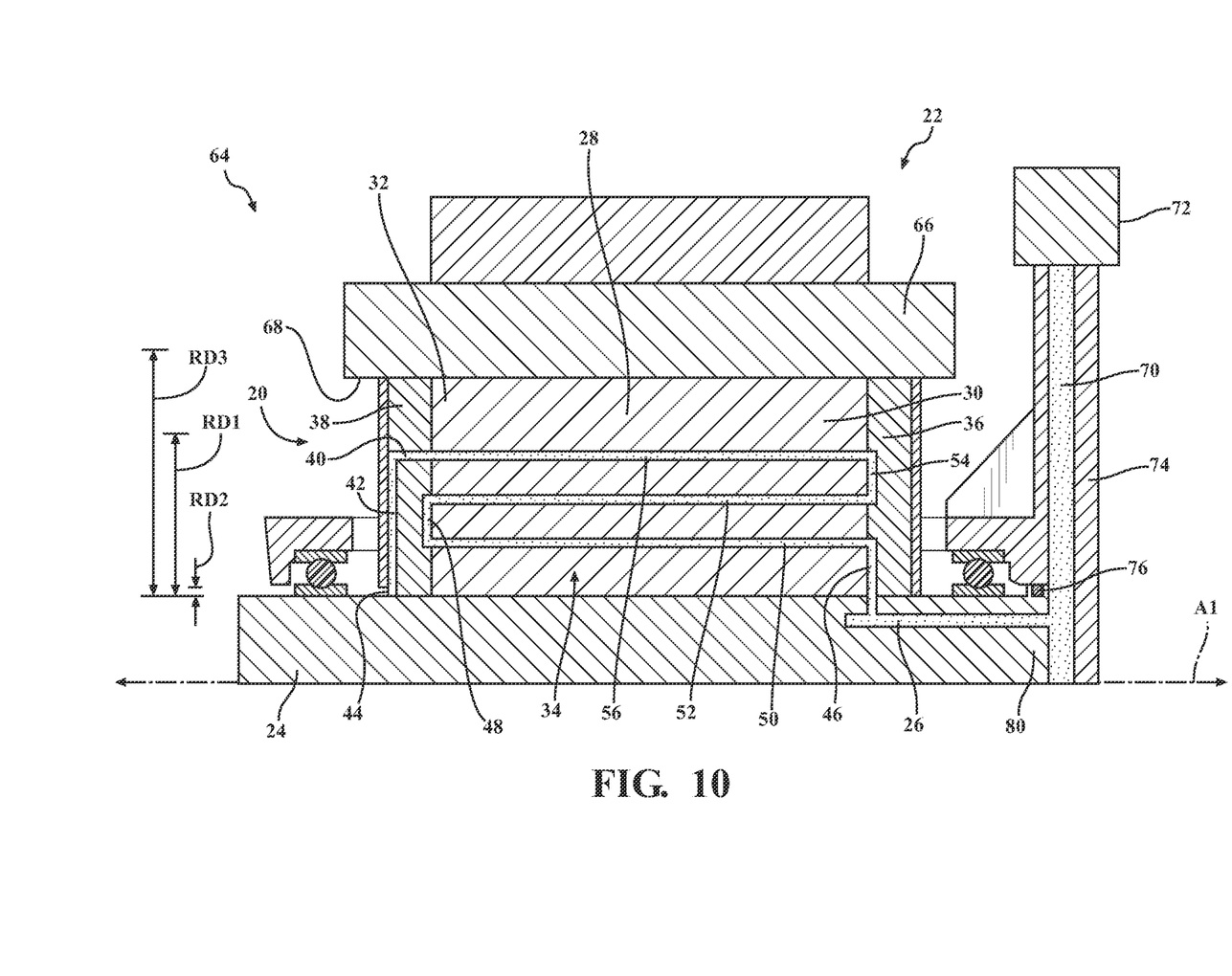
FIG. 10 is a cross-sectional view, with partial schematic illustration, of another embodiment of the rotor assembly in the electric motor system, with the pressurized lubricant feed defined by a housing axially spaced from the shaft.

As shown in FIG. 9, the electric motor system 64 may further include a return line 82 to receive the lubricant expelled from the one of the first end cap 36 and the second end cap 38 to permit reuse of the pressurized lubricant. Although not required, the housing 74 may define the return line 82. The shaft 24 may also define a return channel 84 in fluid communication with the end cap outlet 44 and the return line 82 to direct lubricant from the end cap outlet 44 to the return line 82. In the embodiments where the end cap outlet 44 is defined approximately at the shaft 24, lubricant flowing through the end cap outlet 44 may be directed through the return channel 84.

Figure 3:
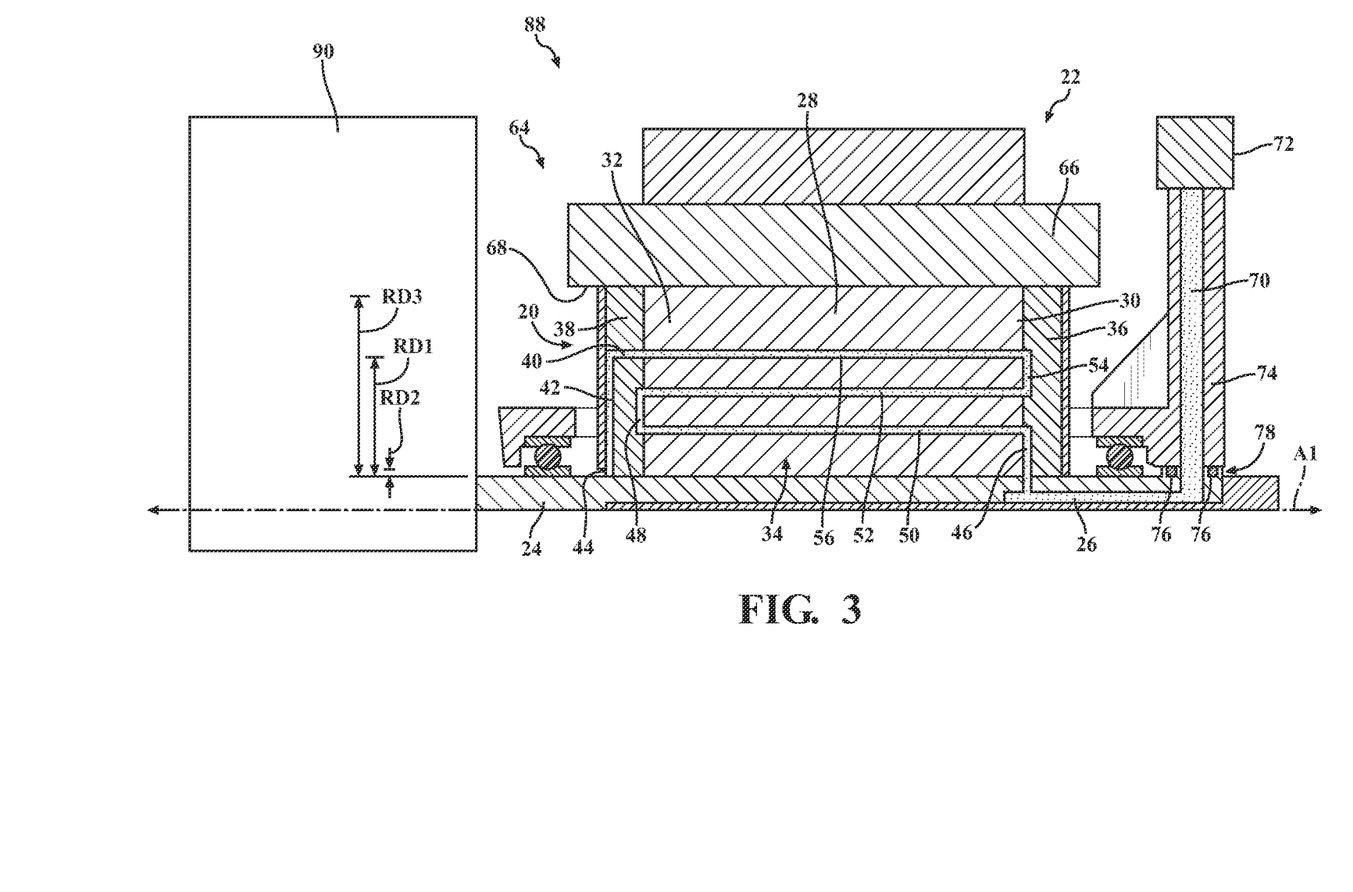
FIG. 3 is a cross-sectional view, with partial schematic illustration, of an electric drive unit system including the electric motor system of FIG. 2 and a gear reduction mechanism.

The electric motor system 64 may further include at least one seal 76 disposed between the housing 74 and the shaft 24 adjacent to the return line 82 to fluidly seal an outlet interface 86 between the housing 74 and the shaft 24. The at least one seal 76 at the outlet interface 86 may have the characteristics of the at least one seal 76 at the inlet interface 78. Additionally, as shown in FIG. 3, an electric drive unit system 88 may include the electric motor system 64 and a gear reduction mechanism 90 coupled to the shaft 24 and configured to modulate torque received from the shaft 24. The gear reduction mechanism 90 may be, but is not limited to, a planetary gearset, a reduction gearbox such as but not limited to a two-stage reduction gearbox, a worm gear reducer, a helical gear reducer, a spur gear reducer, a hypoid gear reducer, a bevel gear reducer, a gear train gear reducer, a cycloidal gear reducer, a magnetic gear reducer, an orthogonal gear reducer, a skew axes gear reducer, a parallel shaft gear reducer, a coaxial gear reducer, and combinations thereof.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A rotor assembly for an electric motor, said rotor assembly comprising:
   a shaft extending along and rotatable about an axis, with said shaft defining a lubricant inlet channel for receiving a lubricant;
   a lamination stack rotatably coupled to said shaft and extending along said axis between a first lamination stack end and a second lamination stack end, with said lamination stack at least partially defining a lubricant cooling channel between said first lamination stack end and said second lamination stack end and in fluid communication with said lubricant inlet channel;
   a first end cap adjacent to said first lamination stack end; and
   a second end cap adjacent to said second lamination stack end;
   wherein one of said first end cap and said second end cap defines,
      an end cap inlet at a first radial distance from said shaft for receiving the lubricant from said lubricant cooling channel,
      a lubricant outlet channel for receiving lubricant from said end cap inlet, with said lubricant outlet channel defined to extend at least partially radially inward toward said shaft, and
      an end cap outlet at a second radial distance from said shaft which is less than said first radial distance for receiving lubricant from said lubricant outlet channel and for expelling lubricant from said one of said first end cap and said second end cap,
wherein said first end cap defines a first end channel for receiving the lubricant from said lubricant inlet channel and for directing the lubricant to said lubricant cooling channel,
wherein said second end cap defines a second end channel for receiving the lubricant from said lubricant cooling channel, and
wherein said lubricant cooling channel is defined to include a first cooling pass extending between said first end channel and said second end channel and a second cooling pass extending from said second end channel toward said first end cap.

2. The rotor assembly as set forth in claim 1, wherein said one of said first end cap and said second end cap extends a third radial distance from said shaft, and wherein said second radial distance of said end cap outlet is less than half of said third radial distance.

3. The rotor assembly as set forth in claim 2, wherein said second radial distance is less than 20% of said third radial distance.

4. The rotor assembly as set forth in claim 1, wherein said one of said first end cap and said second end cap extends a third radial distance from said shaft, and wherein said first radial distance of said end cap inlet is greater than half of said third radial distance.

5. The rotor assembly as set forth in claim 1, wherein said lubricant cooling channel is at least partially delimited by said shaft.

6. The rotor assembly as set forth in claim 1, wherein said first end channel is defined to extend radially outward relative to said axis and wherein said second end channel is defined to extend radially outward relative to said axis.

7. The rotor assembly as set forth in claim 1, wherein said first end cap further defines a third end channel for receiving the lubricant from said second cooling pass, and wherein said lubricant cooling channel is further defined to include a third cooling pass extending from said third end channel toward said second end cap.

8. The rotor assembly as set forth in claim 7, wherein said third end channel is defined to extend radially outward relative to said axis.

9. The rotor assembly as set forth in claim 1, wherein said first end cap defines said end cap inlet, said lubricant outlet channel, and said end cap outlet.

10. The rotor assembly as set forth in claim 1, wherein said second end cap defines said end cap inlet, said lubricant outlet channel, and said end cap outlet.

11. An electric motor system comprising:
an electric motor including,
  a stator extending along an axis and defining a stator interior; and
  a rotor assembly disposed in said stator interior of said stator, said rotor assembly including,
    a shaft extending along and rotatable about an axis, with said shaft defining
    a lubricant inlet channel for receiving a lubricant;
    a lamination stack rotatably coupled to said shaft and extending along said axis between a first lamination stack end and a second lamination stack end, with said lamination stack defining a lubricant cooling channel between said first lamination stack end and said second lamination stack end and in fluid communication with said lubricant inlet channel;
    a first end cap adjacent to said first lamination stack end; and
    a second end cap adjacent to said second lamination stack end;
  wherein one of said first end cap and said second end cap defines,
    an end cap inlet at a first radial distance from said shaft for receiving the lubricant from said lubricant cooling channel,
    a lubricant outlet channel for receiving lubricant from said end cap inlet, with said lubricant outlet channel defined to extend at least partially radially inward toward said shaft, and
    an end cap outlet at a second radial distance from said shaft which is less than said first radial distance for receiving lubricant from said lubricant outlet channel and for expelling lubricant from said one of said first end cap and said second end cap;
a housing disposed about said electric motor; and
a pressurized lubricant feed configured to provide lubricant under pressure to said lubricant inlet channel defined by said shaft, wherein said pressurized lubricant feed is defined at least partially by said housing.

12. The electric motor system as set forth in claim 11 further comprising a pump configured to pressurize lubricant and in fluid communication with said pressurized lubricant feed.

13. The electric motor system as set forth in claim 11 further comprising at least one seal disposed between said housing and said shaft adjacent to said pressurized lubricant feed to fluidly seal an inlet interface between said housing and said shaft.

14. The electric motor system as set forth in claim 11 further comprising a return line to receive the lubricant expelled from said one of said first end cap and said second end cap to permit reuse of the pressurized lubricant.

15. The electric motor system as set forth in claim 14 wherein said shaft defines a return channel in fluid communication with said end cap outlet and said return line to direct lubricant from said end cap outlet to said return line.

16. The electric motor system as set forth in claim 15 further comprising at least one seal disposed between said housing and said shaft adjacent to said return line to fluidly seal an outlet interface between said housing and said shaft.

17. An electric drive unit system comprising:
said electric motor system as set forth in claim 11, and
a gear reduction mechanism coupled to said shaft and configured to modulate torque received from said shaft.

18. An electric motor system comprising:
an electric motor including,
  a stator extending along an axis and defining a stator interior; and
  a rotor assembly disposed in said stator interior of said stator, said rotor assembly including,
    a shaft extending along and rotatable about an axis, with said shaft defining
    a lubricant inlet channel for receiving a lubricant;
    a lamination stack rotatably coupled to said shaft and extending along said axis between a first lamination stack end and a second lamination stack end, with said lamination stack defining a lubricant cooling channel between said first lamination stack end and said second lamination stack end and in fluid communication with said lubricant inlet channel;
    a first end cap adjacent to said first lamination stack end; and
    a second end cap adjacent to said second lamination stack end;

wherein one of said first end cap and said second end cap defines,
an end cap inlet at a first radial distance from said shaft for receiving the lubricant from said lubricant cooling channel,
a lubricant outlet channel for receiving lubricant from said end cap inlet, with said lubricant outlet channel defined to extend at least partially radially inward toward said shaft, and
an end cap outlet at a second radial distance from said shaft which is less than said first radial distance for receiving lubricant from said lubricant outlet channel and for expelling lubricant from said one of said first end cap and said second end cap; and
a return line to receive the lubricant expelled from said one of said first end cap and said second end cap to permit reuse of the pressurized lubricant;
wherein said shaft defines a return channel in fluid communication with said end cap outlet and said return line to direct lubricant from said end cap outlet to said return line.

19. The electric motor system as set forth in claim 18, wherein said first end cap defines a first end channel for receiving the lubricant from said lubricant inlet channel and for directing the lubricant to said lubricant cooling channel,
wherein said second end cap defines a second end channel for receiving the lubricant from said lubricant cooling channel, and
wherein said lubricant cooling channel is defined to include a first cooling pass extending between said first end channel and said second end channel and a second cooling pass extending from said second end channel toward said first end cap.

20. The electric motor system as set forth in claim 18 further comprising a housing disposed about said electric motor and at least one seal disposed between said housing and said shaft adjacent to said return line to fluidly seal an outlet interface between said housing and said shaft.

* * * * *